Sept. 19, 1933.       J. C. CONN              1,927,062
FILM FEEDING APPARATUS
Filed May 26, 1931
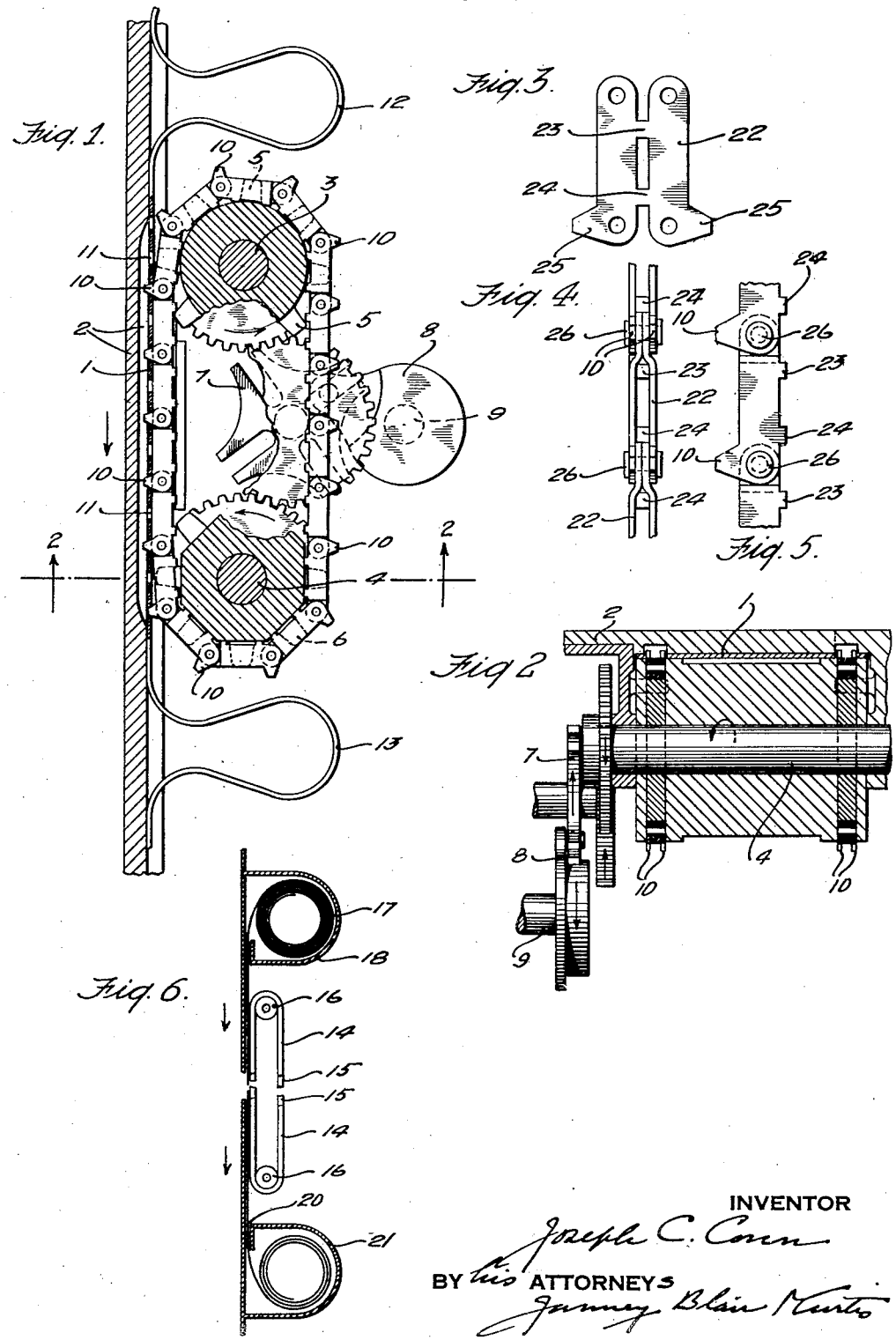
INVENTOR
Joseph C. Conn
BY his ATTORNEYS Patented Sept. 19, 1933

1,927,062

UNITED STATES PATENT OFFICE

1,927,062

FILM FEEDING APPARATUS

Joseph C. Conn, Boonton, N. J.

Application May 26, 1931. Serial No. 540,080

5 Claims. (Cl. 88—18)

The present invention relates to an improvement in film feeding apparatus. One of the difficulties heretofore encountered in the use of film feeding mechanisms has been the breaking or tearing of the film at or near points of engagement of the driving sprockets. The tendency to breakage increases with increased rapidity of operation, and particularly with increased rates of acceleration of the film between stops in the camera and projector. One factor contributing to breakage of film in known types of motion picture apparatus and other devices employing perforated films is the single line engagement of the film with the film driving member, usually a toothed sprocket. This arrangement unduly concentrates practically the entire force employed in film acceleration upon a relatively narrow single portion or cross section of the film, namely, that part between the two opposite perforations which happens to be engaged by the driving sprocket. One object of my invention has been to provide a film driving apparatus whereby the initial impact or thrust of the driving member will be distributed over a substantial length of film instead of across a single line. It is contemplated that this improvement will be applicable to any structure in which a perforated film is moved in relation to an aperature.

My invention will be better understood from a description of a preferred embodiment thereof, as set forth in the following specification taken in connection with the appended drawing, in which Figure 1 is a longitudinal section on the line 1—1 of Figure 2;

Figure 2 is a transverse section on the line 2—2 of Figure 1;

Figure 3 a top plan view of a blank from which side members of a drive chain may conveniently be formed;

Figure 4 a fragmentary top plan view of links assembled to form a drive chain;

Figure 5 a side elevation of the chain construction illustrated in Figure 4; and Figure 6 a modification illustrating the application of my improved driving mechanism to one form of a still camera.

Referring to the drawing, the illustrated structure discloses a film 1, mounted in operative relation to an apertured wall 2 on one side, and a suitable film driving apparatus on the other side. The latter includes, as shown in Figure 1, two shafts 3 and 4, each provided with sprocket teeth, 5 and 6 respectively, and rotated intermittently by a geneva or other suitable movement including a star wheel 7 and a crank arm 8, mounted on a shaft 9. Two endless chains are mounted to engage the two sets of sprocket teeth 5 and 6, said chains being equipped with film driving teeth or lugs 10, positioned and adapted to engage the lines of perforations 11 adjacent to the lateral edges of the film 1. In the embodiment of the invention shown in Figure 1, my improved film driving mechanism is shown in connection with apparatus in which the driven portion of the film engages suitable driving devices arranged between loops 12 and 13 of the film as in known types of motion picture cameras and projectors.

In the modification illustrated in Figure 6, the film is advanced by endless chains 14 and 15 actuated in any suitable manner, as by rotating one of the sprockets 16 in the direction of the arrow from a roll 17 in a film receptacle 18 through apertures 19 and 20 into a film receiving receptacle 21.

Referring to Figures 3, 4 and 5, the film driving chains hereinabove referred to may be made up of links formed from blanks such as those illustrated in Figure 3 and which include side members 22 connected by webs 23 and 24, each side member being provided at one end with a lateral extension 25. In making and assembling a driving chain, the side members 22 are bent toward each other leaving the webs 23 and 24 as spacing members adapted to engage the sprocket teeth 5 and 6 respectively when in assembled position in relation to the illustrated driving mechanism. The ends of the blank opposite the extensions 25 are bent toward and into engagement with each other as indicated more clearly in Figure 4. Thus, when these ends are inserted between the spaced opposite ends of another similar link, the two links may be pivoted together by means of a pin or the like 26.

The specific form of link construction hereinabove described is shown as suitable for use in connection with the illustrated driving mechanism although it is contemplated that any suitable type of chain construction may be so employed.

I claim as my invention:

1. A link for film driving chains, comprising side members, a spacing web between said side members, and opposed spaced film engaging drive teeth at one side of the web, end portions of said side members being bent toward each other at the other side of said web.

2. A link for film driving chains comprising integral side members and a web connecting said members in spaced relation, opposed end portions of said members at one side of said web presenting drive teeth, and the other end portions of said side members being bent toward each other at the other side of said web.

3. Apparatus for advancing a film having regularly spaced perforations, comprising an endless chain of pivotally connected links each having a film engaging tooth projecting outwardly from only one end thereof opposite the pivotal connection between said end and the adjacent end of the next link, and means for driving the chain.

4. Apparatus for advancing a film having regularly spaced perforations, comprising an endless chain provided with film driving links each of which has an outwardly projecting tooth positioned to move into and out of a perforation in the film during advancing movement of the chain, said tooth being positioned at one end of the link and opposite the common pivotal connection between said end of the link and the contiguous end of an adjacent link.

5. Apparatus for advancing a film having regularly spaced perforations, comprising an endless chain provided with film driving links each of which has an outwardly projecting tooth positioned to move into and out of a perforation in the film during advancing movement of the chain, said tooth being positioned at one end of the link and with its axis in radial relation to the axis of the common pivotal connection between said end of said driving link and the contiguous end of the next adjacent link.

JOSEPH C. CONN.